United States Patent
Li et al.

(10) Patent No.: US 10,872,469 B2
(45) Date of Patent: *Dec. 22, 2020

(54) SYSTEM AND METHOD FOR SUBDIVIDING LARGE POLYGON MESH DATASETS INTO HIERARCHICAL SUBSETS FOR LEVEL-OF-DETAIL USE

(71) Applicant: Cesium GS, Inc., Exton, PA (US)

(72) Inventors: Kangning Li, North Wales, PA (US); Sean Lilley, Exton, PA (US); Daniel Bagnell, Exton, PA (US)

(73) Assignee: Cesium GS, Inc., Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/824,064

(22) Filed: Mar. 19, 2020

(65) Prior Publication Data
US 2020/0302692 A1 Sep. 24, 2020

Related U.S. Application Data

(60) Provisional application No. 62/822,234, filed on Mar. 22, 2019.

(51) Int. Cl.
| | | |
|---|---|---|
| G06T 17/00 | (2006.01) | |
| G06T 17/20 | (2006.01) | |
| G06T 15/00 | (2011.01) | |
| G06T 11/00 | (2006.01) | |
| G06T 3/40 | (2006.01) | |

(52) U.S. Cl.
CPC ........ G06T 17/205 (2013.01); G06T 2210/36 (2013.01)

(58) Field of Classification Search
CPC .................. G06T 17/205; G06T 2210/36
See application file for complete search history.

(56) References Cited

U.S. PATENT DOCUMENTS

| | | | | |
|---|---|---|---|---|
| 7,262,713 | B1* | 8/2007 | Vogl | G01C 23/00 340/961 |
| 9,330,486 | B1* | 5/2016 | Hulet | G06T 15/40 |
| 2003/0117403 | A1* | 6/2003 | Park | G06T 15/005 345/503 |
| 2008/0266287 | A1* | 10/2008 | Ramey | G06T 17/20 345/419 |
| 2015/0097832 | A1* | 4/2015 | Rice | G06T 17/20 345/424 |

* cited by examiner

*Primary Examiner* — Sing-Wai Wu
(74) *Attorney, Agent, or Firm* — The Marbury Law Group, PLLC

(57) ABSTRACT

Systems, methods, devices, and non-transitory media of various embodiments enable subdividing large polygon meshes with diverse materials into a hierarchy of separate components, such as tiles. In various embodiments, the components may in aggregate represent the entire mesh. In the hierarchies of separate components as provided by the various embodiments, the components may be loaded as-needed based on importance, culled due to lack of importance to a given view, and/or replaced with higher or lower detail variants depending on importance to a given view. The ability to load components, such as tiles, on-demand provided by the various embodiments may provide improved rendering performance of a large polygon mesh with diverse materials, especially when the rendering leverages data transmission over a network.

19 Claims, 13 Drawing Sheets

SYSTEM AND METHOD FOR SUBDIVIDING LARGE POLYGON MESH DATASETS INTO HIERARCHICAL SUBSETS FOR LEVEL-OF-DETAIL USE

RELATED APPLICATIONS

This application claims priority to U.S. Provisional Application No. 62/822,234 filed on Mar. 22, 2019 entitled "System and Method For Subdividing Large Polygon Mesh Datasets Into Hierarchical Subsets For Level-Of-Detail Use," the entire contents of which are hereby incorporated by reference.

BACKGROUND

Computer graphics, and especially three-dimensional visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render.

SUMMARY

The systems, methods, devices, and non-transitory media of the various embodiments enable subdividing large polygon meshes with diverse materials into a hierarchy of separate components, such as tiles. In various embodiments, the components may in aggregate represent the entire mesh. In the hierarchies of separate components as provided by the various embodiments, the components may be loaded as-needed based on importance, culled due to lack of importance to a given view, and/or replaced with higher or lower detail variants depending on importance to a given view. The ability to load components, such as tiles, on-demand provided by the various embodiments may provide improved rendering performance of a large polygon mesh with diverse materials, especially when the rendering leverages data transmission over a network.

Various embodiments may include methods for subdividing large polygon mesh datasets into hierarchical subsets for level-of-detail use. In various embodiments, the methods may include grouping triangles in a triangle mesh dataset by material use to create one or more material groups, determining and storing a hierarchy of tiles within each material group; and generating and storing a hierarchical level-of-detail (HLOD) structure indicating the tiles and all material groups. In various embodiments, the methods may also include generating placeholder tiles for any tiles exceeding a processing budget, and updating the HLOD structure to indicate the placeholder tiles. In various embodiments, the methods may also include generating children tiles of place holder tiles. The children tiles may be generated such that the children tiles in aggregate include the original data that exceeds the processing budget, but individually the children tiles meet the processing budget. In various embodiments, the methods may also include determining a priority for rendering of each tile in the HLOD structure, and indicating the priority for rendering of each tile in the HLOD structure.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

In addition to the challenges faced in rendering high quality three-dimensional objects due to the large amount of data involved and the often spread out nature of the file locations, high quality three-dimensional objects may not be needed in every visualization. For example, when a camera view point for a three-dimensional model is zoomed out sufficiently, a low-quality three-dimensional object may be suitable for rendering. Accordingly, in three-dimensional visualization it can be beneficial to create multiple versions of a three-dimensional object, such as a high-quality version and a low-quality version.

Textures are often used in computer graphics to increase the detail of information on the surface of triangle meshes. Surface information may include base color, static light color/intensity, influence weight for deformation algorithms, and parameters for shading algorithms, such as bump mapping or subsurface scattering.

Large polygon meshes, such as large indexed triangle meshes, can be difficult to render, especially when rendering requires streaming data for the large polygon mesh over a network, due to the amount of polygon and/or texture data in the mesh. As such, many large polygon meshes may be unsuitable for rendering, especially network-based rendering.

Polygon meshes, and specifically indexed triangle meshes, may include a list of ordered vertices defining attributes such as positions, texture coordinates, or per-vertex colors, and lists of ordered indices forming the polygons. Polygon meshes may be derived from numerous common methods for defining polygon meshes.

Figure 1:
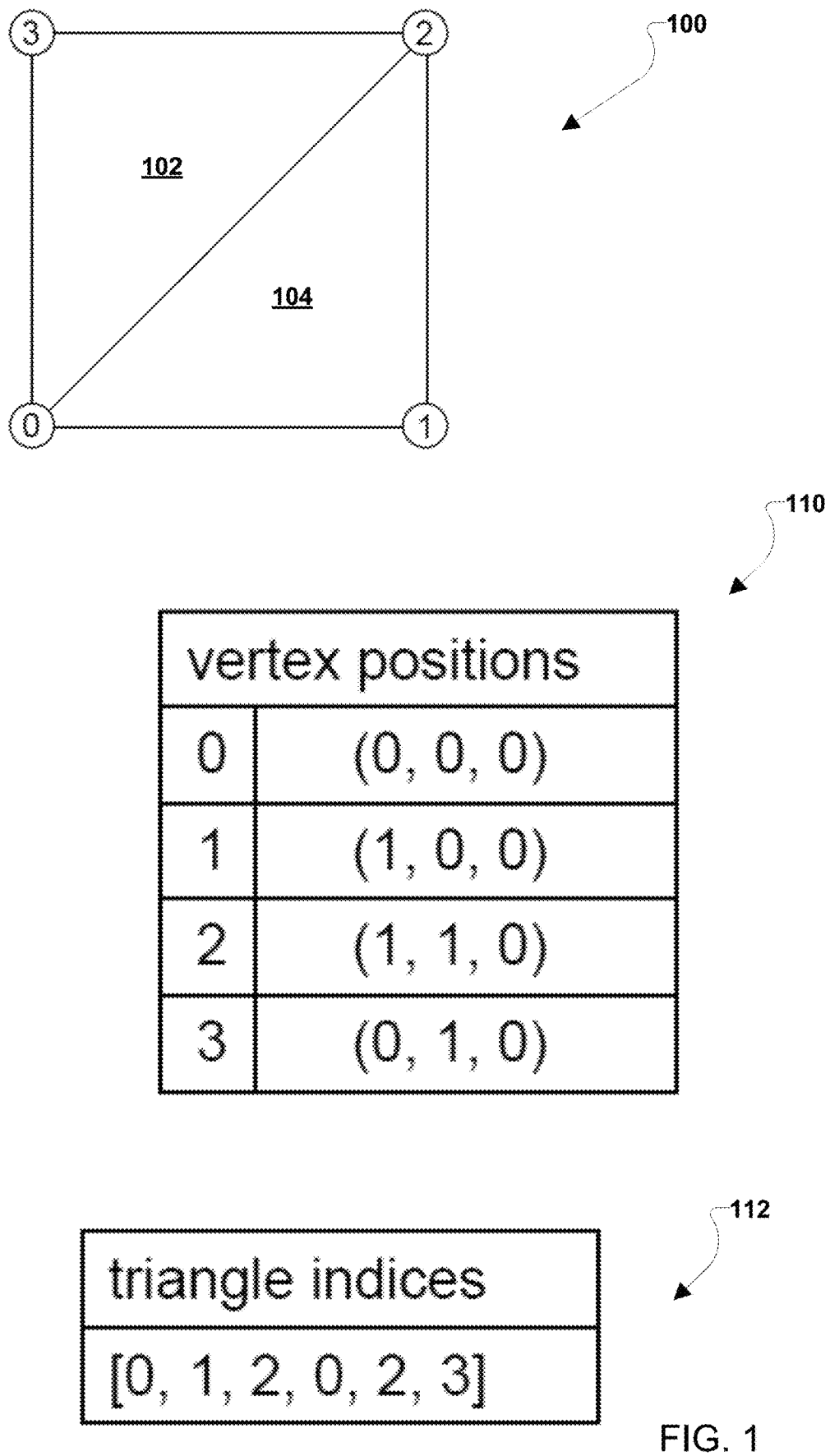
FIG. 1 illustrates an example square mesh represented as two triangles composed of indexed vertices.

For example, FIG. 1 illustrates a triangle mesh 100 of a square shape represented as two indexed triangles 102 and 104. The four vertex positions 110 of the mesh 100 may be defined along with the triangle indices 112. The vertex positions 110 and triangle indices 112, along with the material (e.g., images) that the triangles 102 and 104 should be rendered with, may represent the data that defines the triangle mesh 100. Multiple groups of triangles, such as triangles 102 and 104, may use the same material.

The systems, methods, devices, and non-transitory media of the various embodiments enable subdividing large polygon meshes, such as large indexed triangle meshes, with diverse materials into a hierarchy of separate components, such as tiles. In various embodiments, the components may in aggregate represent the entire mesh. In the hierarchies of separate components as provided by the various embodiments, the components may be loaded as-needed based on importance, culled due to lack of importance to a given view, and/or replaced with higher or lower detail variants depending on importance to a given view. The ability to load components, such as tiles, on-demand provided by the various embodiments may provide improved rendering performance of a large polygon mesh with diverse materials, especially when the rendering leverages data transmission over a network.

In various embodiments, a triangle mesh represented as a list of triangles defined as vertices and indices along with materials, such as images, for use with those triangles may be received at a computing device, such as a computing device preparing and/or providing graphical models for rendering. A triangle mesh for rendering of graphics models may be received at a computing device over a network connection. Each group of triangles may use any of the provided materials. For example, one or more data files defining the triangle mesh as a list of triangles represented as vertices and indices and images for those triangles may be received by a computing device.

In various embodiments, a budget may be received by a computing device. In some embodiments, the budget may be a vertex count per tile and/or a material expense, such as a material expense in the form of total image use. In some embodiments, the budget may be a triangle budget and/or a material expense. Setting the budget as a vertex budget corresponding to a vertex count below $2^{16}$ may permit the use of two unsigned bytes (i.e., 16 bits) for each index in the vertex list as opposed to using a vertex budget which may necessitate using four unsigned bytes (e.g., 32 bits) for each index. In various embodiments, tuning the budget, such as the vertex budget or triangle budget, may avoid producing groups of triangles that cause either too many small draw calls or draw calls that may be too large to achieve appropriate rendering.

In various embodiments, the budget and the triangle mesh represented as a list of triangles defined as vertices and indices along with materials, such as images, for use with those triangles may be used by the computing device as inputs to the method to subdivide the triangle mesh into a hierarchical subset for level-of-detail use. In various embodiments, the method may include grouping triangles in the triangle mesh by material use. In some embodiments, all triangles may be grouped in the triangle mesh by material use. In various embodiments, the computing device may generate a hierarchy of tiles within each material's group of triangles. As a specific example, the computing device may generate a hierarchy of visual importance of tiles within each material's group of triangles. In various embodiments, the method may include generating the hierarchy such that each tile meets the budget (e.g., the vertex budget) when possible. In various embodiments, the method may include grouping triangles into spatially isolated tiles in each level of the hierarchy. In various embodiments, the method may include generating a placeholder for a tile that may be determined to be too expensive (e.g., a tile with a rendering expense in processing resource and/or time that is above a maximum expense threshold). As a specific example, a tile that exceeds a vertex budget may be determined to be too expensive. In various embodiments, the method may include assigning each tile a priority for rendering (e.g., a geometric error) that may or may not be derived from the visual priority of the tile. The process of generating tiles and placeholders may be the most computationally expensive portion of the method. In addition, the process of generating tiles and generating placeholders for a specific material may be independent of the process of generating tiles and placeholders for any other material. As each material may be independent and the tiles and place holders may be generated independently according to the various embodiment methods, the performance of the various embodiment methods by a computing device may be parallelized in order to accelerate processing using multiple processors as each material may be handled independently and simultaneously by different processors.

Figure 2:
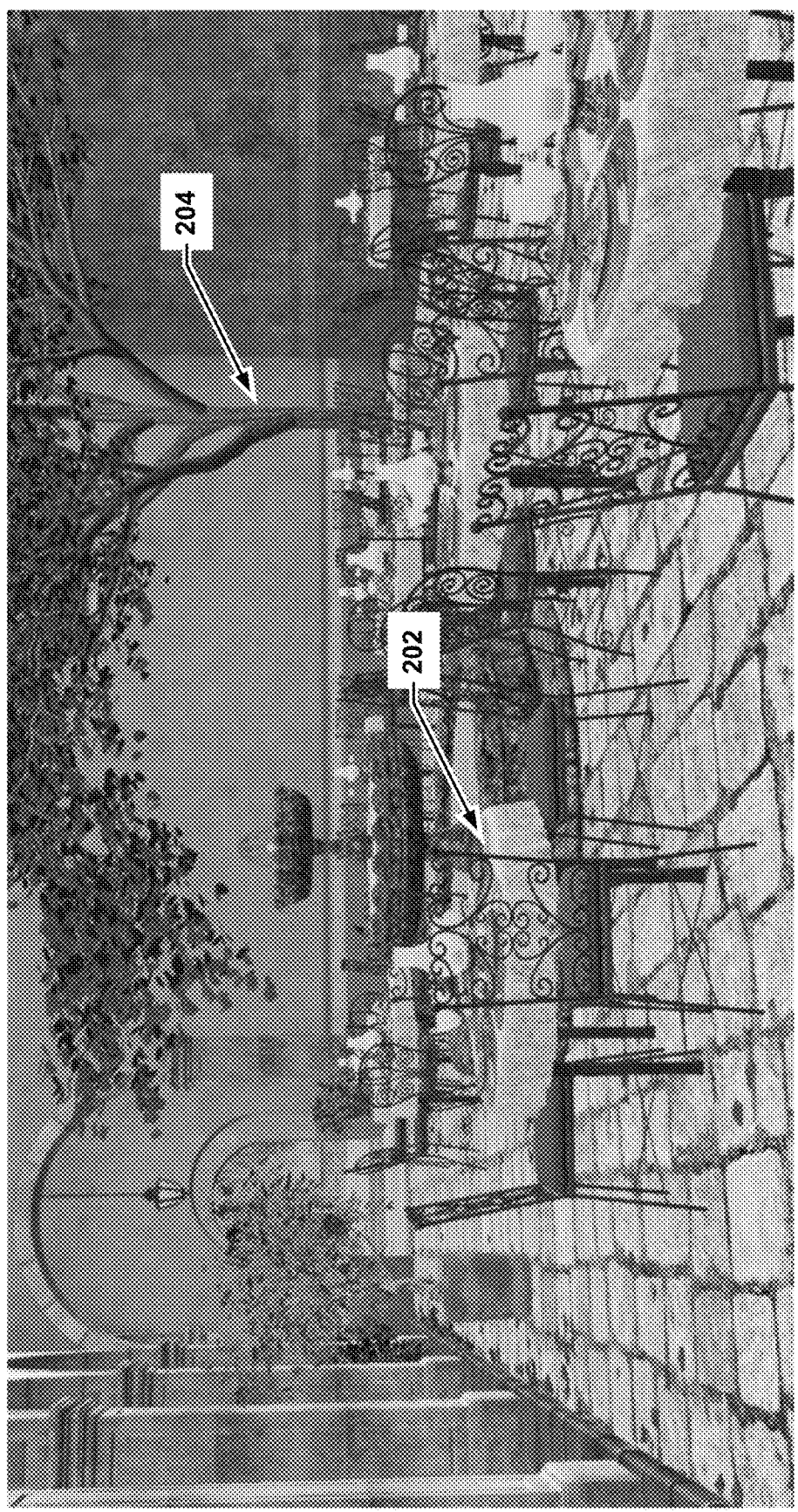
FIG. 2 illustrates a model rendered as tiles according to various embodiments.

FIG. 2 illustrates a model 200 rendered as tiles. The model 200 may be generated according to various embodiments from an original large indexed triangle mesh. The model 200 may be formed by breaking the original large indexed triangle mesh into smaller groups of polygons for streaming over a network and/or rendering.

In various embodiments, each tile in the model 200 may include only polygons to be rendered with the same material. As each tile may only include polygons to be rendered for the same material, the polygons included in that tile may be rendered together in a constant number of graphics processing unit (GPU) commands (or "draw calls") as determined based on the material of the tile, rather than the number of triangles in the tile.

In various embodiments, the number of the tiles and/or the size of tiles in the model 200 may be selected such that the number and/or the size of the tiles does not result in such a large number of tiles in the model 200 that the total number of tiles negatively impacts performance in rendering the model 200 due to the aggregate fixed cost of each draw call. The aggregate fixed cost may scale with the number of draw calls as the aggregate fixed cost may be a per-draw call cost.

In various embodiments, the size of the tiles in the model 200 may be selected such that the size of the tiles is not so large that rendering tiles negatively impacts performance due to an excessive number of polygons per draw call.

In various embodiments, in the model 200 materials that are expensive in processing time and/or resources to render may be assigned inexpensive in processing time and/or resources to render placeholders. In this manner, when the full detail of the expensive materials may not need to be rendered, only the less expensive placeholders may be rendered, thereby avoiding the full cost of rendering the tiles having expensive materials.

In various embodiments, tiles in the model 200 may be assigned priorities such that tiles may be rendered according to priority. In some embodiments, higher priority tiles may be tiles including features viewable at farther view distances and lower priority tiles may be tiles including features viewable only at closer view distances. In this manner, lower priority tiles may not be rendered when unneeded, for example due to the view distance being too great for the tiles to be visible. For example, based on a view distance as illustrated in FIG. 2, tiles 202 for place setting features on a table may be given a lower priority as the place setting features are not visible at a far view distance, while tiles 204 for the tree feature may be assigned a higher priority as the tree are visible at a far view distance.

In various embodiments, tiles may be assigned spatial bounding volumes in a hierarchy. In various embodiments, the spatial hierarchy may enable a renderer to compute whether a tile, the tile's parent tiles, and/or the tile's children tiles are out of view and may not need to be rendered. In various embodiments, the assignment of spatial bounding volumes to tiles in a hierarchy may enable efficient determination by a renderer of which tiles may need rendering and which tiles may not need rendering at a given time.

Figure 3:
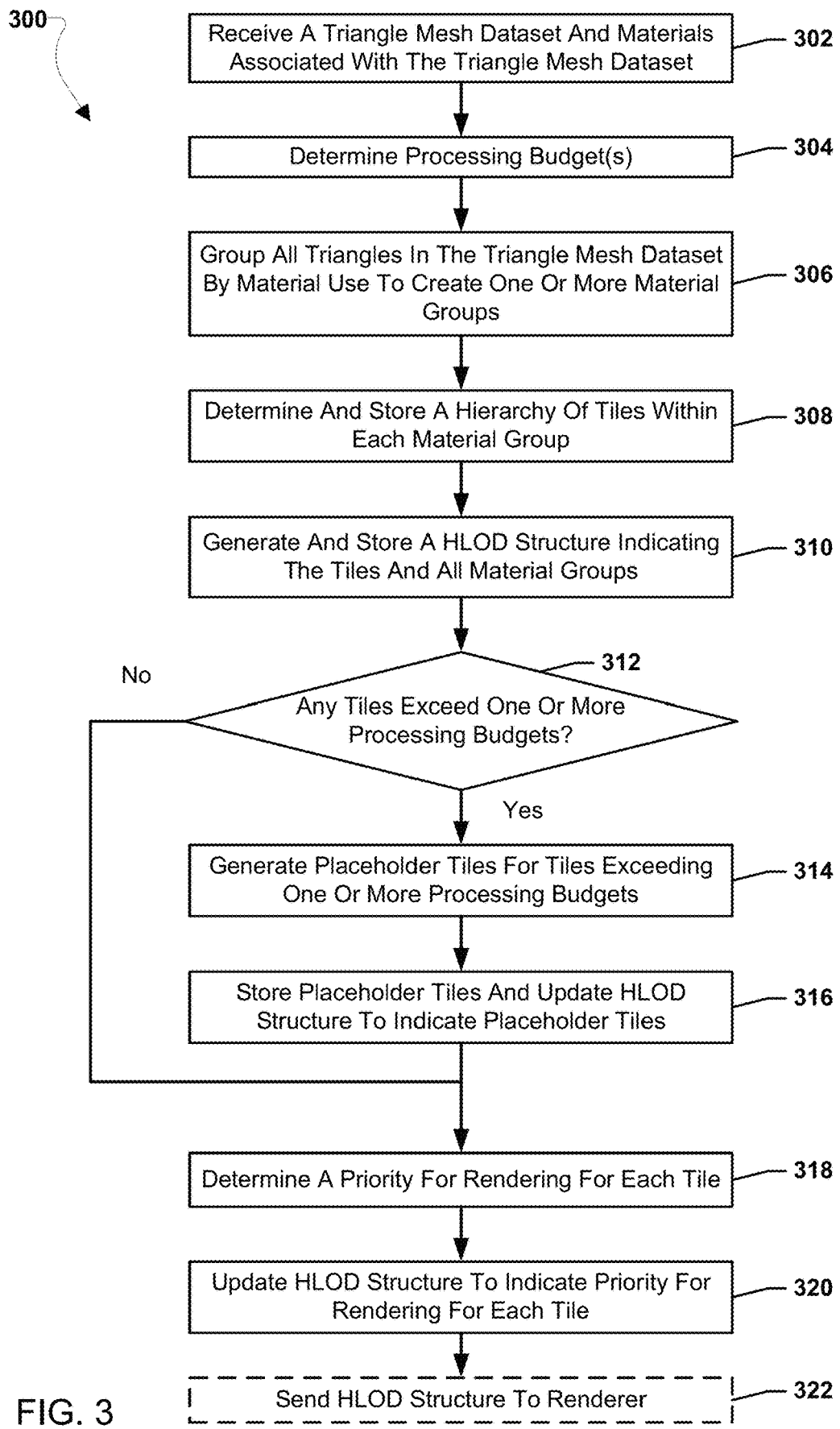
FIG. 3 is a process flow diagram illustrating an embodiment method for subdividing large polygon mesh datasets into hierarchical subsets for level-of-detail use.

FIG. 3 illustrates an embodiment method 300 for subdividing large polygon mesh datasets into hierarchical subsets for level-of-detail use. In various embodiments, the operations of method 300 may be performed by a component of a computing device, such as a CPU, graphics processing unit (GPU), etc. The operations of method 300 may produce a hierarchy structure of tiles that may enable the mesh dataset, such as the triangle mesh dataset, to be rendered on a display using the tiles. The hierarchy structure of the tiles may enable rendering of a large polygon mesh dataset remotely over a network connection. The tiles may be described in a hierarchical-level-of-detail (HLOD) structure that may enable a renderer to request and render tiles as needed for a given view.

In block 302, the computing device may receive a triangle mesh dataset and materials associated with the triangle mesh dataset. The triangle meshes dataset may include lists of triangles defined by vertices and indices and indications of the material that each triangle should be rendered with. In various embodiments, receiving the triangle mesh dataset may include storing the triangle mesh dataset in a memory location and/or receiving the triangle mesh dataset over a network.

In block 304, the computing device may determine one or more processing budgets. In various embodiments, the one or more processing budgets may be a series of budget values that rendering of a tile should not exceed. For example, the one or more processing budgets may be a vertex count per tile budget, a material expense budget (e.g., a total image use budget, etc.), or a triangle count per tile budget. In some embodiments, the processing budgets may be combined budgets, such as a vertex count per tile and a budget for material expense, for example in the form of total image use, such as a triangle count per tile and a budget for material expense, or any other type combined processing budget. As a specific example, determining the processing budget as a vertex budget corresponding to a vertex count below $2^{16}$ may permit the use of two unsigned bytes (i.e., 16 bits) for each index in the vertex list as opposed to using a triangle budget which may necessitate using four unsigned bytes (e.g., 32 bits) for each index. In various embodiments, determining the processing budgets may include tuning the budgets, such as the vertex budget or triangle budget, to thereby avoid producing groups of triangles that cause either too many small draw calls or draw calls that may be too large.

In block 306, the computing device may group triangles in the triangle mesh dataset by material use to create one or more material groups. In some embodiments, the computing device may group all triangles in the triangle mesh by material use. In various embodiments, the triangle mesh dataset may be parsed to identify the materials indicated therein associated with each triangle (e.g., the materials to use in rendering each indicated triangle). Triangles with the same material listed, or with two or more distinct materials that can be merged together listed, may use functionally identical materials. As an example, if a dataset contains two materials "material_0" and "material_1", but both materials result in a triangle looking red, "material_0" and "material_1" may be merged together into "material Red". As such, "material_0" and "material_1" may be functionally identical materials. Similarly, triangles with the same material (e.g., two triangles with the "material_1") may be described as having functionally identical materials. The two or more functionally identical materials may be merged together and the groups of triangles using the functionally identical materials may be grouped into a single material group. In this manner, each of the one or more material groups may include the triangles in the triangle mesh dataset associated with the functionally identical material unique to that respective group. In various embodiments, any input grouping for a triangle may be preserved when generating a group of triangles that use a material. For example, if an input mesh provides four groups of triangles that all use the same wood material, a material group of those four groups all using the same wood material may be generated.

In block 308, the computing device may determine and store a hierarchy of tiles within each material group. In various embodiments, a scatter operation and a gather operation may be used to attempt to generate tiles from the material groups that may meet the processing budget, such as the vertex budget.

Figure 4:
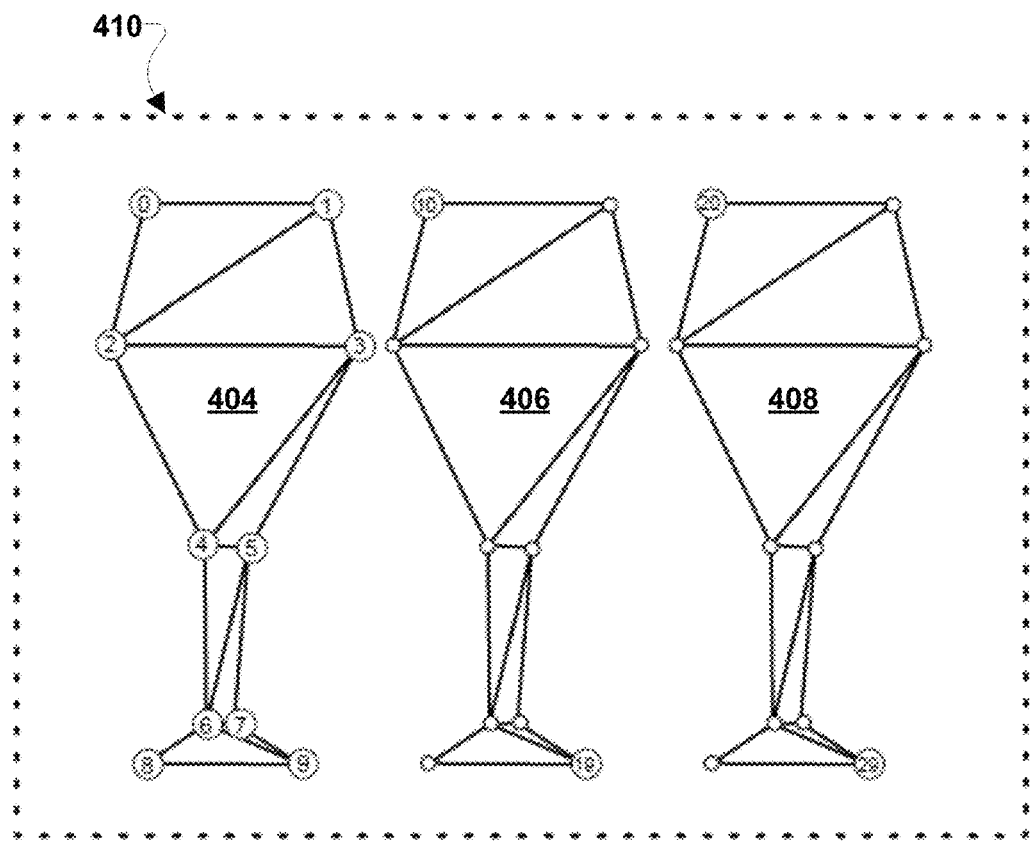
FIG. 4 illustrates an example of several perception groups in a single group of triangles referencing a shared list of vertices.
Figure 5:
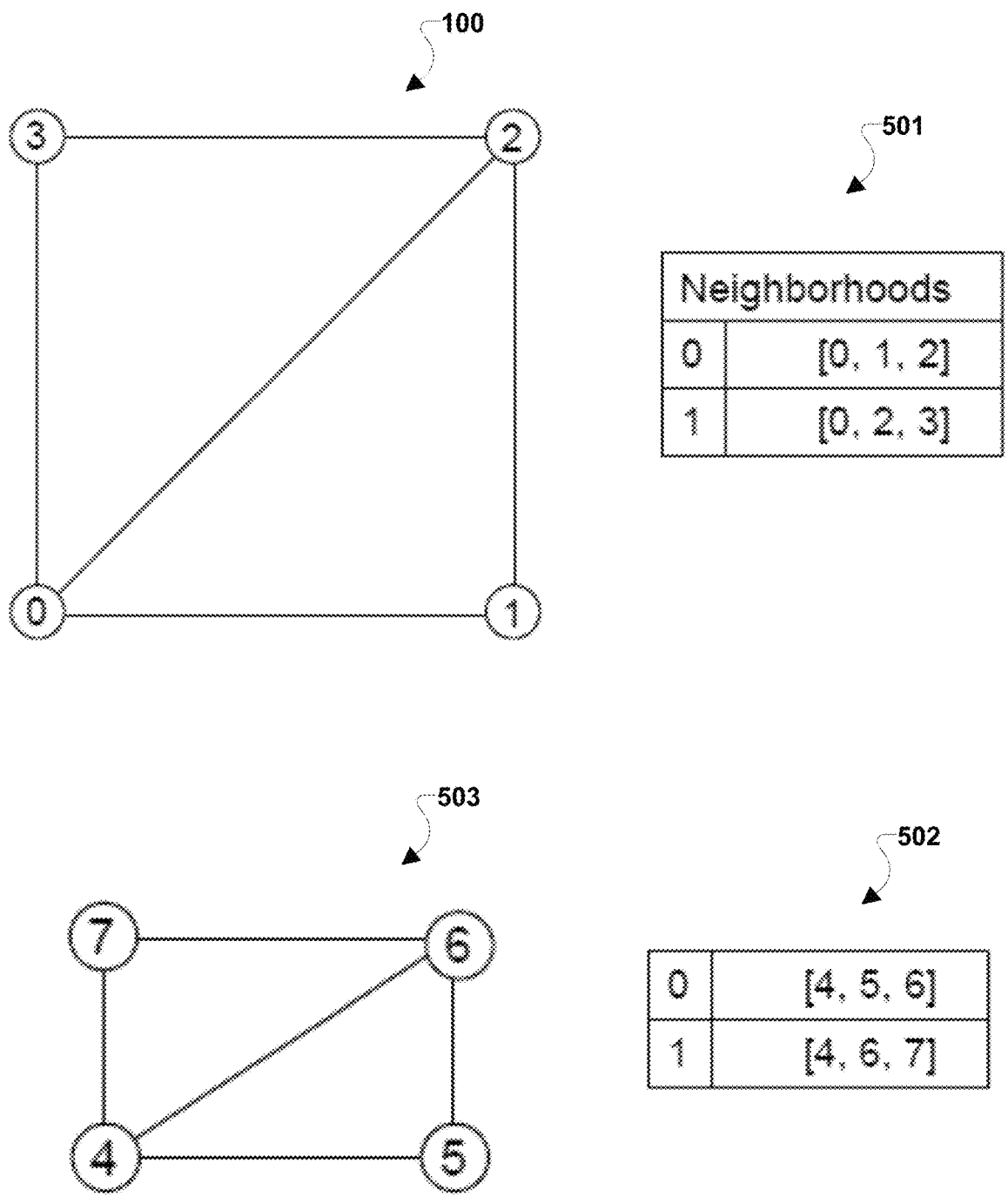
FIG. 5 illustrates an example of neighborhoods of disjointed triangles within a single group of triangles referencing a shared list of vertices.
Figure 6:
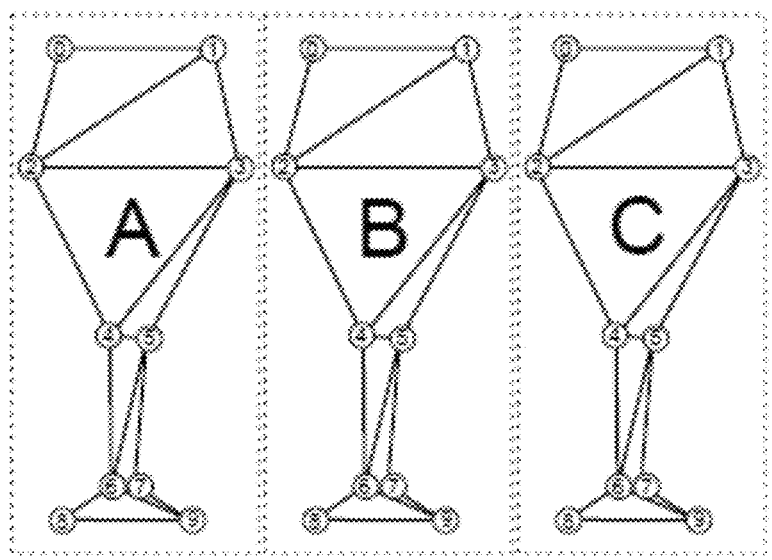
FIG. 6 illustrates an example of a single list of triangles separated into multiple groups of triangles when triangle neighborhoods may be a suitable analogy for perception groups.
Figure 6:
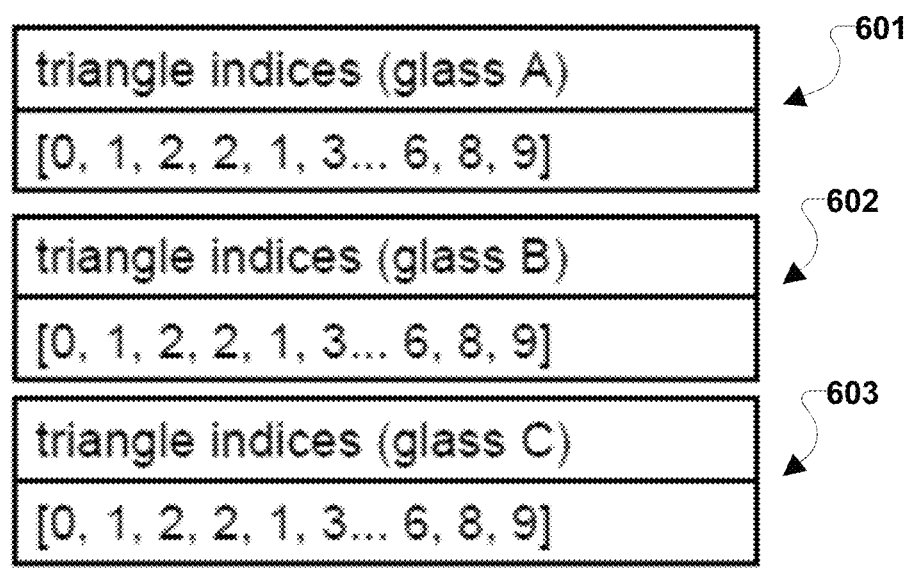

In some embodiments, the scatter operation may be used to attempt to identify groups of triangles that should be perceived together. Groups of triangles that should be perceived together may be referred to as a "perception group." The list of triangles for the triangle mesh dataset may include multiple perception groups. For example, as illustrated in FIG. 4, a single list of triangles 402 that defines several drinking glasses 404, 406, 408 may be a perception group 410 that may include several perception groups (or said another way, several lists of triangles), each consisting of all the triangles in one of each of the drinking glasses 404, 406, 408 (e.g., each drinking glass may be its own perception group, that is its own list of triangles, that make up the larger perception group 410 defined by the larger list of triangles 402). In some embodiments, triangles in a list of triangles may share vertices, making them neighbors as illustrated in FIG. 5 which shows two neighborhoods 501, 502 of triangle meshes 100 and 503, respectively. Continuing with drinking glasses as an example, if none of the triangles in a glass share vertices with any triangles in any other drinking glasses, the list of all triangles in all the drinking glasses may be "scattered" into groups, each including a single drinking glass, and, thus, forming a single perception group, by searching for connected components in a graph generated from all the indices in the overarching group. FIG. 6 illustrates such an example of triangle indices for several separate groups of glasses A, B, and C as several separate perception groups, 601, 602, 603, respectively. FIG. 6 illustrates a single list of triangles separated into multiple groups of triangles when triangle neighborhoods may be suitably analogous for perception groups. In FIG. 6, each glass A, B, C may be a separate group 601, 602, 603, with each list referencing a separate group of ten vertices numbered zero through nine.

Figure 7:
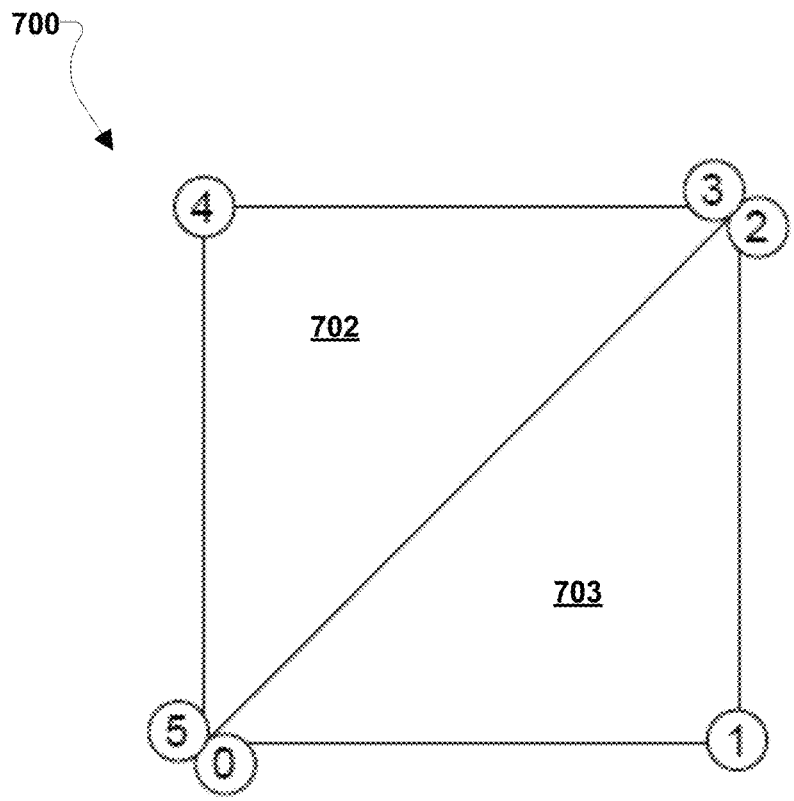
FIG. 7 illustrates an example of non-neighboring triangles that may be perceived together.

Alternatively, input triangle lists in the triangle mesh dataset may include non-neighboring triangles that should be perceived together. For example, non-neighboring triangles that should be perceived together may be defined by two triangles forming a square area defined by six positions with two sets of duplicates, such that none of the triangles shares a vertex with another triangle as illustrated in FIG. 7. In FIG. 7, the triangles 702, 703 may be non-neighboring triangles that should be perceived together and form a square area 700 defined by six positions with two sets of duplicates, such that none of the triangles 702, 703 shares a vertex with another triangle. To prevent fragmenting the square area 700 into disconnected triangles, scatter may be performed only when an input list of triangles exceeds the vertex budget.

Figure 8:
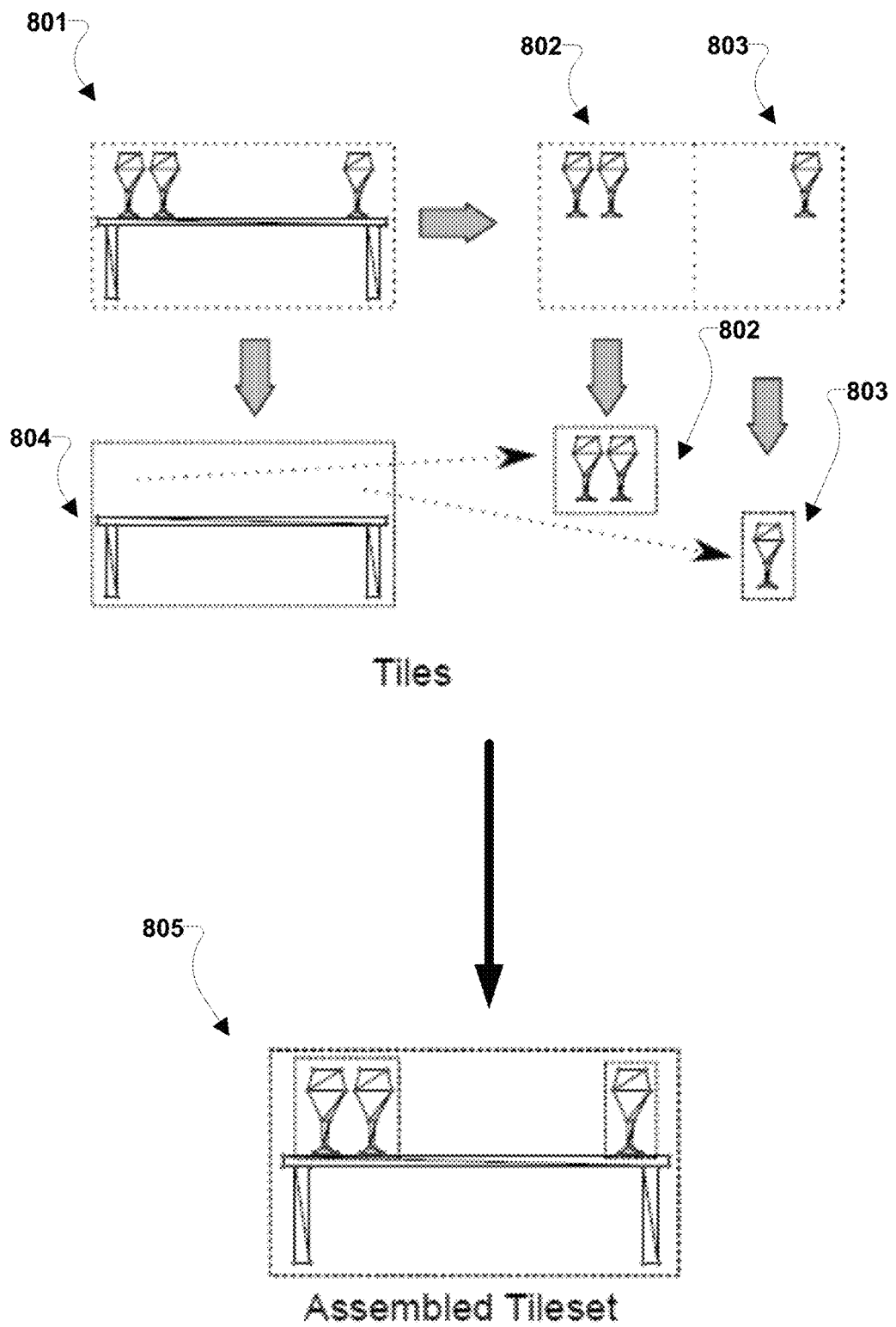
FIG. 8 illustrates an example scene subdivided based on visual importance.

In various embodiments, the gather operation may assemble the most visually important perception groups within areas into tiles that meet the vertex budget. Perception groups may be sorted based on the visual importance heuristic and then added to the tile, starting with the most visually important group, until adding another perception group may exceed the vertex budget. When a perception group exceeds the vertex budget on its own, the perception group may take up an entire tile on its own. The area that each tile covers may be determined using a bounding volume hierarchy. The most important tile in the dataset may first be generated as a tile covering the entire dataset's volume or area, the area of that tile may be subdivided into smaller regions that may each be covered by a less important child tile in the hierarchy. For example, FIG. 8 illustrates a scene 801 of a table with three wineglasses on the table. The scene 801 may be subdivided based on visual importance into a tile of the table 804 and two tiles of the wine glasses 802, 803. The tiles of the wine glasses 802, 803 may be less visually important than the tile of the table 804 as the wineglasses on the table may not be visible at the view distances that the table may be visible. The assembled tile set 805 may include the wineglass tiles 802, 803 and the table tile 804. In some embodiments, the surface area of perception groups may be used to determine "visual importance." However, other metrics or techniques may be used to determine "visual importance", including, but not limited to, bounding volume dimensions, a volume of the bounding volume, average pixel count following rasterization of the perception group or its bounding volume from a consistent distance at various angles, material color intensity, material detail frequency, a volume of the perception group when treated as a closed mesh, a volume of the perception group when voxelized, a volume of the perception group's convex hull in some number of dimensions, etc.

Referring back to FIG. 3, in block 310, the computing device may generate and store a HLOD structure indicating the tiles and all the material groups. In this manner, once the tiles and material groups are determined, the tiles may be stored in a HLOD structure describing the tiles. For example, the HLOD structure may be stored in a memory available to the computing device.

In determination block 312, the computing device may determine whether any tiles exceed any of the one or more processing budgets. For example, applicable characteristics of each tile may be compared corresponding type processing budgets that may have been defined for use in generating a model from the triangle mesh dataset, such as a vertex count per tile budget, a material expense budget (e.g., a total image use budget, etc.), and/or a triangle count per tile budget. Triangle meshes that may contain individual "perception groups" that exceed a processing budget (e.g., a vertex count per tile budget, a material expense budget (e.g., a total image use budget, etc.), a triangle count per tile budget, etc.) may be inefficient to render.

In response to determining a tile exceeds a processing budget (e.g., determination block 312="Yes"), the computing device may generate placeholder tiles for tiles exceeding the one or more processing budgets in block 314. Identifying oversized tiles may enable cheaper placeholders to be generated for those oversized tiles that a renderer may use when the full-size tile is unnecessary. As the placeholders may be smaller than the full-size tile, the rendering of the cheaper tile may be more efficient than rendering the full-size tile.

Figure 9:
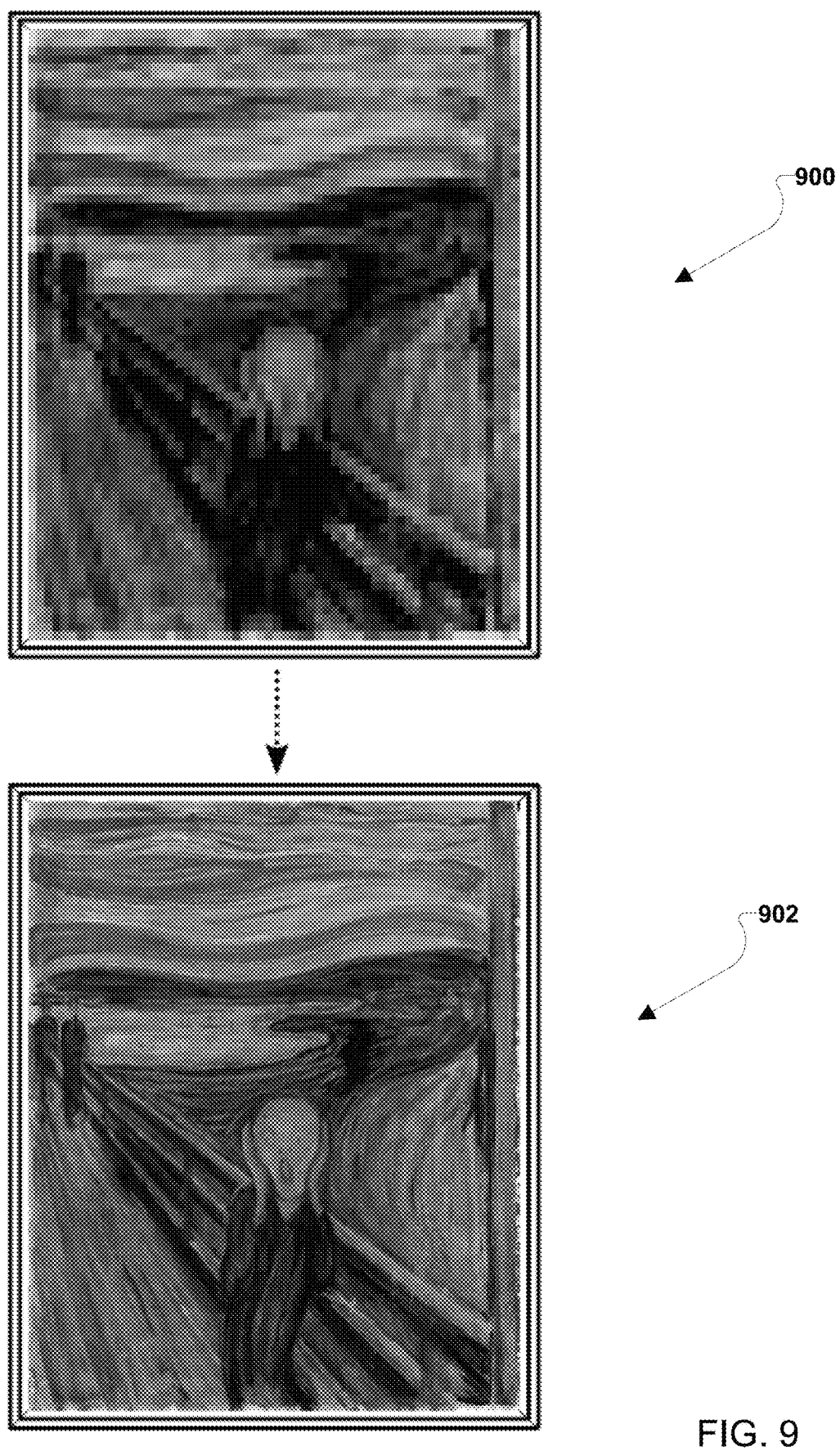
FIGS. 9-11 illustrate examples of generated placeholder tiles and original source resolution tiles.

For example, as illustrated in FIG. 9, a tile including a framed picture 902 may use a material that references an extremely high-resolution image. The tile including the framed picture 902 may be identified as over-budget due to the high-resolution image and the computing device may generate a tile carrying a low-resolution version of the extremely high-resolution image. The tile carrying the low-resolution version of the image may be placeholder tile 900. The placeholder tile 900 with the lower resolution image may include a reference to the full-resolution tile 902 so that a rendering engine may switch to the full resolution tile 902 when needed, for example, if the view is sufficiently close to the framed picture to distinguish between the low-resolution placeholder tile 900 and the high-resolution version of the tile 902.

Figure 10:
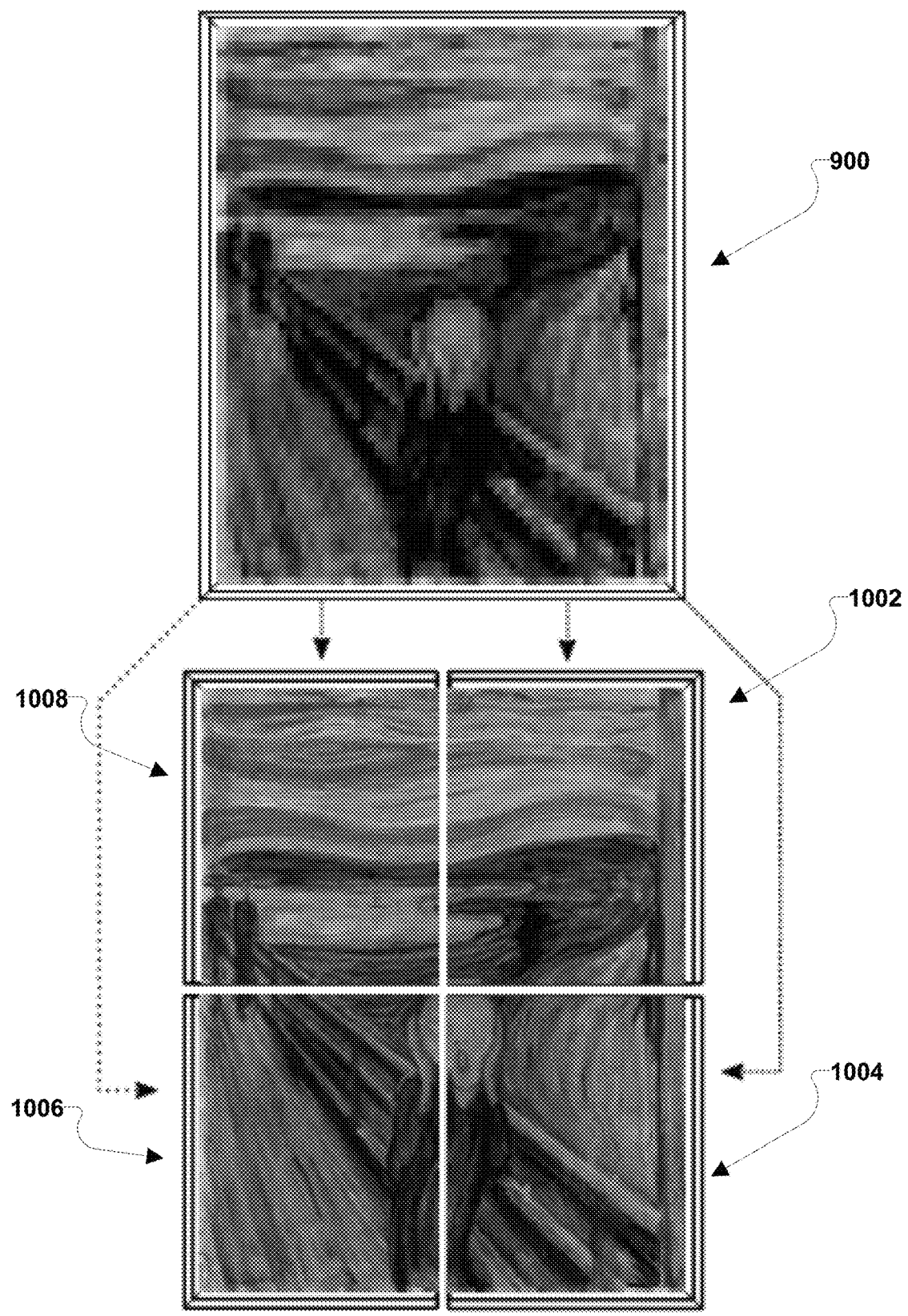

In some embodiments, as illustrated in FIG. 10, in addition to generating the placeholder tile 900, the computing device may generate a HLOD structure for the original full resolution tile 902 as a hierarchy of tiles 1002, 1004, 1006, and 1008 that may function as an image pyramid of tiles. The HLOD structure may identify the placeholder tile 900 as the parent and the four source-resolution tiles 1002, 1004, 1006, and 1008 as children each covering a quarter of the original full resolution image 902. The placeholder tile 900, the four source-resolution tiles 1002, 1004, 1006, and 1008, and the separate HLOD structure may be stored in a memory available to the computing device and the placeholder tile 900 may include a reference to the four source-resolution tiles 1002, 1004, 1006, and 1008 and the separate HLOD structure. In this manner, when only a portion of the placeholder tile 900 may be in view, a renderer may only need to render the higher resolution source tile or tiles (e.g., one or more of tiles 1002, 1004, 1006, and 1008) that may be visible in the portion of the placeholder tile 900 in view. In some embodiments, as the view may be seeing more than one high-resolution tile at a given time, an image pyramid of tiles with more than just the illustrated tiles 1002, 1004, 1006, and 1008 may be created such that the tiles 1002, 1004, 1006, and 1008 may be placeholder tiles as well with children tiles of their own.

Figure 11:
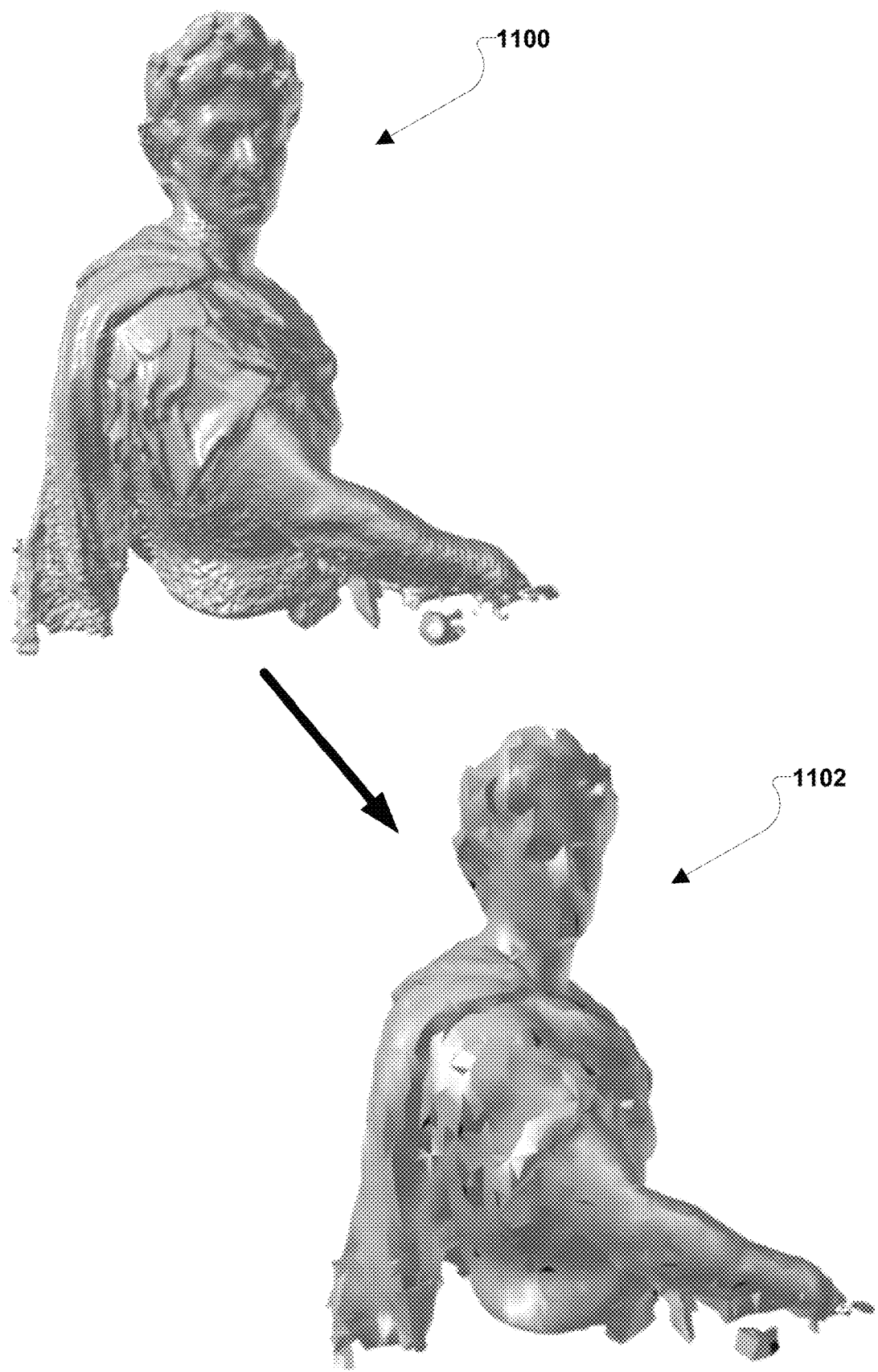

Similarly, as illustrated in FIG. 11, a placeholder tile 1102 may also be a mesh using fewer triangles than that in a higher resolution mesh of an original tile 1100. The original tile 1100 may include too many triangles and thus be over a triangle count per tile budget. The mesh of the original tile 1100 may be reduced in a level of detail to have less triangles, thereby generating placeholder tile 1102 using various level of detail reduction techniques. The placeholder tile 1102 may thus include a visually similar mesh to the original tile 1100, but the triangle count in the placeholder tile 1102 may be less than the triangle count in the original tile 1100.

Referring back to FIG. 3, in block 316, the computing device may store the placeholder tiles and update the HLOD structure to indicate the placeholder tiles. Additionally, any children tiles and HLOD structures for placeholder tiles generated by the computing device may be stored. In this manner, once the placeholder tiles are generated, the placeholder tiles may be stored in the HLOD structure describing tiles, both original tiles and placeholder tiles. For example, the HLOD structure may be stored in a memory available to the computing device.

In response to storing the placeholder tiles and updating the HLOD structure in block 316 or in response to determining no tiles exceed any processing budgets (i.e., determination block 312="No"), the computing device may determine a priority for rendering each tile in block 318. In some embodiments, the priority for rendering may be a geometric error of the tile corresponding to a size attribute, such as a radius, height, width, etc., of the object or objects in the tile. Each tile, original and/or placeholder, in the HLOD may be assigned a priority indication that may be metadata that may be used by a renderer to determine how significant a tile is to a given view in a scene when the renderer has determined that the tile is likely to be in view. This significance may be referred to as screen-space error, and increases as the viewer gets closer to a tile. For example, when the viewer is far from a small ball in a scene, removal of the small ball contributes a small amount of "error" to the view, versus including the ball in the view, by changing a small number of pixels in the view. As the camera gets closer, the amount of "error" increases because the missing ball becomes more noticeable as its absence changes a larger number of pixels in the view. Based on screen space error, the renderer may choose not to render the tile due to low screen space error or prioritize which tiles the renderer loads and/or renders depending on which tiles contribute the most screen space error to the current view. The renderer computes screen space error from a metric called geometric error, which describes how incorrect the scene is in meters if a tile is removed or replaced by a placeholder. In the example above, the geometric error of the sphere may be its radius, as the total pixel contribution may be approximated fairly accurately from the radius and a mathematical description of the camera. As one example, geometric error for more complex shapes may be determined via a method similar to those discussed above for determining "visual importance" in generating tiles wherein the area covered by a tile may represent the tile's geometric error and, thereby, the tile's priority for rendering. When a placeholder tile has been generated for a tile that contains too much data (i.e., a tile exceeding a processing budget), the placeholder tile may be given a higher geometric error (e.g., a priority for rendering) than the original tile, such that a renderer may prefer to use the low-resolution placeholder, only swapping in the expensive, high-detail tile at close views where the detail is more likely to be distinguished.

In block 320, the computing device may update the HLOD structure to indicate the priority for rendering for each tile. For example, the computing device may store a priority for rendering, such as a geometric error, etc., for each tile in the HLOD structure.

In optional block 322, the computing device may send the HLOD structure to a renderer. For example, the HLOD structure may be sent to a renderer running on the computing device and/or sent over a network to a renderer running on another computing device. Using the HLOD structure, the renderer may determine tiles needed to render a current view of the model described by the HLOD structure and may retrieve only those tiles needed to render the current view, such as by requesting the tiles be transmitted over a network and/or accessing a memory location storing the tiles. The tiles needed to render the current view may be a combination of original tiles and/or placeholder tiles. As only the tiles needed to render the current view may be identified and retrieved by the renderer using the HLOD structure, the original triangle mesh dataset used to generate the tiles may not need to be entirely provided to the render and/or transmitted over a network to enable rendering the current view. Block 322 may be optional as the HLOD structure may not be immediately sent to a renderer in some embodiments. For example, the HLOD structure of tiles may remain in storage for use on-demand, rather than being rendered immediately.

Figure 12:
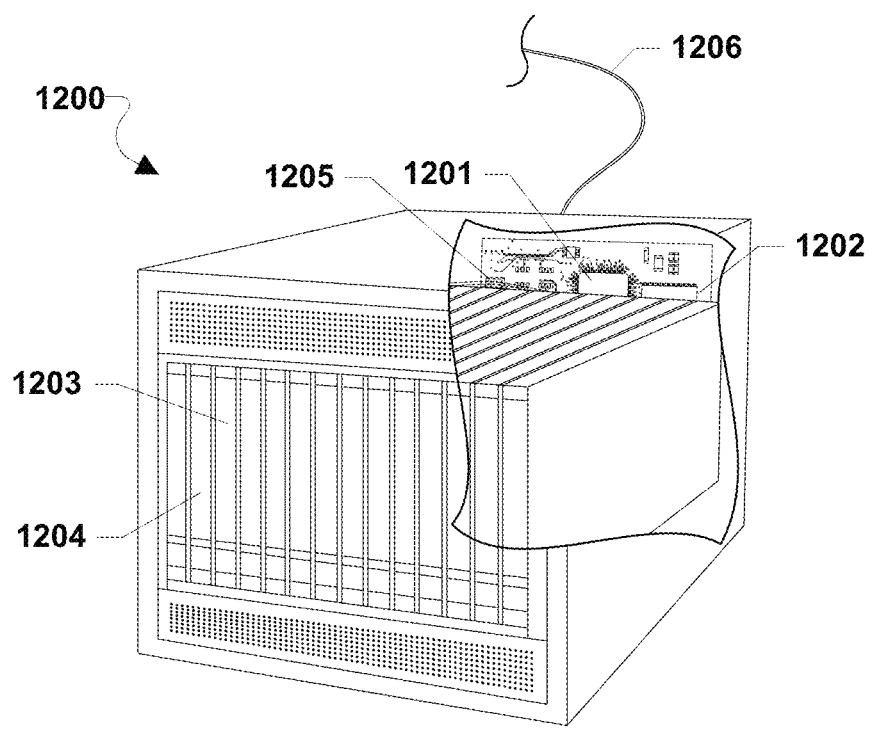
FIG. 12 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1204 coupled to the processor 1201. The server 1200 may also include network access ports 1205 coupled to the processor 1201 for establishing data connections with a network 1206, such as a local area network coupled to other broadcast system computers and servers. The processor 1201 may be any programmable microprocessor, microcomputer or multiple processor chip or chips that may be configured by software instructions (applications) to perform a variety of functions, including the functions of the various embodiments described above. Typically, software applications may be stored in the internal memory 1202, 1203 before they are accessed and loaded into the processor 1201. The processor 1201 may include internal memory sufficient to store the application software instructions.

Figure 13:
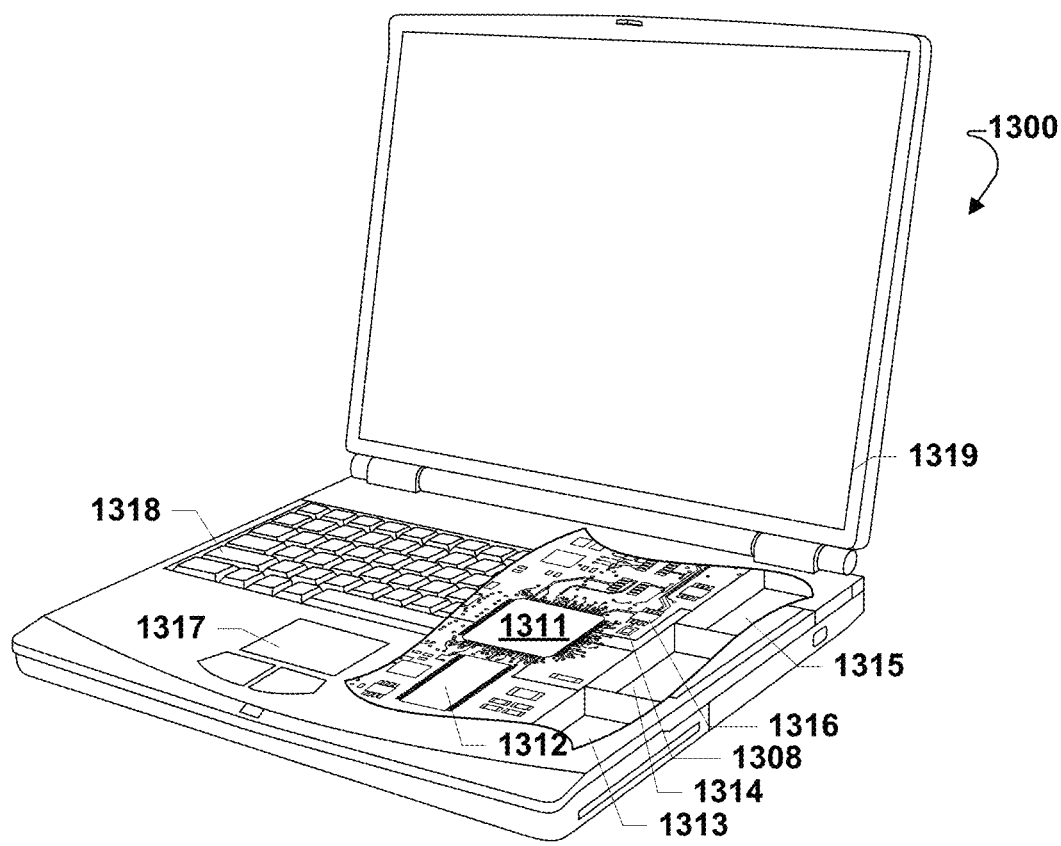
FIG. 13 is a component block diagram of a laptop that is a computing device suitable for use in the various embodiments.

The various embodiments described above may also be implemented within a variety of computing devices, such as a laptop computer 1300 illustrated in FIG. 13. Many laptop computers include a touchpad touch surface 1317 that serves as the computer's pointing device, and thus may receive drag, scroll, and flick gestures similar to those implemented on mobile computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antennas 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for subdividing large polygon mesh datasets into hierarchical subsets for level-of-detail use, comprising:

grouping triangles in a triangle mesh dataset by material use to create at least two different material groups;
determining and storing a hierarchy of tiles within each material group;
generating and storing a hierarchical level-of-detail (HLOD) structure indicating the tiles and all the material groups, wherein:
  each of the at least two different material groups comprises the triangles in the triangle mesh dataset associated with any functionally identical materials unique to that respective group; and
  each of the at least two different material groups preserves any triangle groups associated with the functionally identical materials unique to that respective group indicated in the triangle mesh dataset; and
in parallel, and on a separate processor for each of the at least two different material groups:
  generating placeholder tiles for any tiles exceeding a combined processing budget comprising a vertex count per tile of below $2^{16}$ and a material expense below a threshold, wherein each placeholder tile has a lower level of detail than the respective tile exceeding the combined processing budget for which that placeholder tile was generated; and
  generating children tiles for at least one placeholder tile based on the respective tile exceeding the combined processing budget for which that placeholder tile was generated, wherein the children tiles have a same resolution as the respective tile exceeding the processing budget for which that placeholder tile was generated.

2. The method of claim 1, wherein determining and storing the hierarchy of tiles within each material group comprises:
identifying triangles that should be perceived together when rendered as a perception group of triangles; and
adding the perception group of triangles to a same tile.

3. The method of claim 1, wherein determining and storing the hierarchy of tiles within each material group comprises assembling perception groups of triangles together in the same tile until a vertex count per tile budget is met for the same tile.

4. The method of claim 1, wherein determining and storing the hierarchy of tiles within each material group comprises prioritizing tiles based on a visual importance of the perception group within the tile.

5. The method of claim 4, wherein visual importance is based at least in part on surface area.

6. The method of claim 1, wherein grouping triangles in a triangle mesh dataset by material use to create at least two different material groups comprises grouping all triangles in the triangle mesh dataset by material use to create at least two different material groups.

7. The method of claim 1, further comprising:
determining a priority for rendering of each tile in the HLOD structure; and
indicating the priority for rendering of each tile in the HLOD structure.

8. The method of claim 7, wherein the priority for rendering for each tile is that tile's geometric error.

9. A computing device, comprising:
a graphic display; and
a processor connected to the graphic display, wherein the processor is configured with processor executable instructions to perform operations comprising:
  grouping triangles in a triangle mesh dataset by material use to create at least two different material groups;
  determining and storing a hierarchy of tiles within each material group;
  generating and storing a hierarchical level-of-detail (HLOD) structure indicating the tiles and all the material groups, wherein:
    each of the at least two different material groups comprises the triangles in the triangle mesh dataset associated with any functionally identical materials unique to that respective group; and
    each of the at least two different material groups preserves any triangle groups associated with the functionally identical materials unique to that respective group indicated in the triangle mesh dataset; and
  controlling a separate processor for each of the at least two different material groups to, in parallel, perform operations to:
    generate placeholder tiles for any tiles exceeding a combined processing budget comprising a vertex count per tile of below $2^{16}$ and a material expense below a threshold, wherein each placeholder tile has a lower level of detail than the respective tile exceeding the combined processing budget for which that placeholder tile was generated; and
    generate children tiles for at least one placeholder tile based on the respective tile exceeding the combined processing budget for which that placeholder tile was generated, wherein the children tiles have a same resolution as the respective tile exceeding the processing budget for which that placeholder tile was generated.

10. The computing device of claim 9, wherein the processor is configured with processor executable instruction to perform operations such that determining and storing the hierarchy of tiles within each material group comprises:
identifying triangles that should be perceived together when rendered as a perception group of triangles; and
adding the perception group of triangles to a same tile.

11. The computing device of claim 9, wherein the processor is configured with processor executable instruction to perform operations such that determining and storing the hierarchy of tiles within each material group comprises assembling perception groups of triangles together in the same tile until a vertex count per tile budget is met for the same tile.

12. The computing device of claim 9, wherein the processor is configured with processor executable instruction to perform operations such that determining and storing the hierarchy of tiles within each material group comprises prioritizing tiles based on a visual importance of the perception group within the tile.

13. The computing device of claim 12, wherein visual importance is based at least in part on surface area.

14. The computing device of claim 9, wherein the processor is configured with processor executable instruction to perform operations such that grouping triangles in a triangle mesh dataset by material use to create at least two different material groups comprises grouping all triangles in the triangle mesh dataset by material use to create at least two different material groups.

15. The computing device of claim 9, wherein the processor is configured with processor executable instruction to perform operations further comprising:

determining a priority for rendering of each tile in the HLOD structure; and indicating the priority for rendering of each tile in the HLOD structure.

16. The computing device of claim 15, wherein the priority for rendering for each tile is that tile's geometric error.

17. A non-transitory processor readable medium having stored thereon processor-readable instructions configured to cause a processor of a computing device to perform operations comprising:

grouping triangles in a triangle mesh dataset by material use to create at least two different material groups;

determining and storing a hierarchy of tiles within each material group;

generating and storing a hierarchical level-of-detail (HLOD) structure indicating the tiles and all the material groups, wherein:

each of the at least two different material groups comprises the triangles in the triangle mesh dataset associated with any functionally identical materials unique to that respective group; and each of the at least two different material groups preserves any triangle groups associated with the functionally identical materials unique to that respective group indicated in the triangle mesh dataset; and controlling a separate processor for each of the at least two different material groups to, in parallel, perform operations to:

generate placeholder tiles for any tiles exceeding a combined processing budget comprising a vertex count per tile of below $2^{16}$ and a material expense below a threshold, wherein each placeholder tile has a lower level of detail than the respective tile exceeding the combined processing budget for which that placeholder tile was generated; and generate children tiles for at least one placeholder tile based on the respective tile exceeding the combined processing budget for which that placeholder tile was generated, wherein the children tiles have a same resolution as the respective tile exceeding the processing budget for which that placeholder tile was generated.

18. The non-transitory processor readable medium of claim 17, wherein the processor-readable instructions are configured to cause a processor of a computing device to perform operations such that determining and storing the hierarchy of tiles within each material group comprises:

identifying triangles that should be perceived together when rendered as a perception group of triangles; and adding the perception group of triangles to a same tile.

19. The non-transitory processor readable medium of claim 17, wherein the processor-readable instructions are configured to cause a processor of a computing device to perform operations further comprising:

determining a priority for rendering of each tile in the HLOD structure; and indicating the priority for rendering of each tile in the HLOD structure.

* * * * *